UNITED STATES PATENT OFFICE.

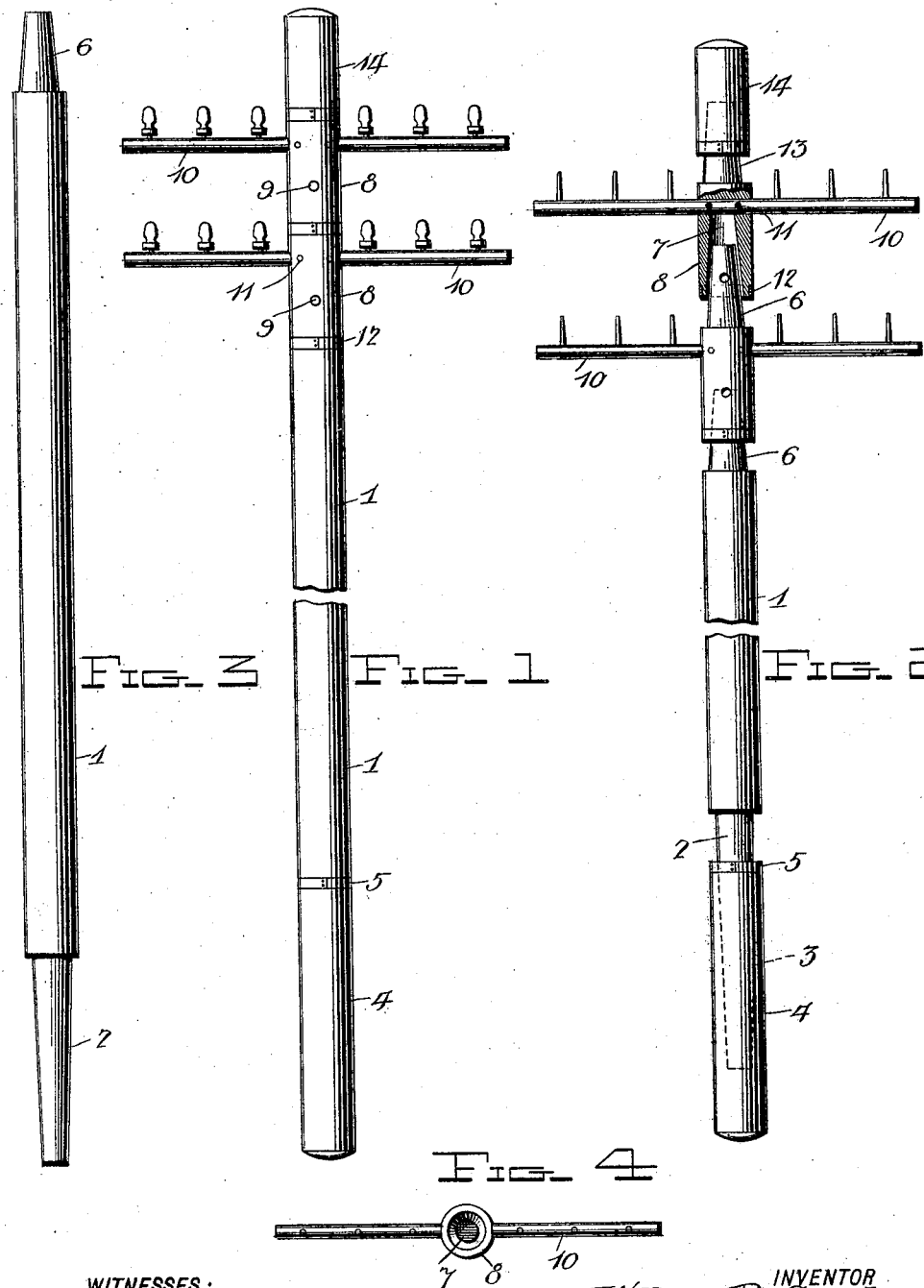

WILLIAM B. CROSSLAND, OF GUTHRIE, OKLAHOMA TERRITORY.

SECTIONAL ELECTRIC LIGHT, TELEPHONE, OR TELEGRAPH POLE.

SPECIFICATION forming part of Letters Patent No. 689,387, dated December 24, 1901.

Application filed June 24, 1901. Serial No. 65,883. (No model.)

*To all whom it may concern:*

Be it known that I, WILLIAM B. CROSSLAND, a resident of Guthrie, Logan county, Oklahoma Territory, have invented a Sectional Electric Light, Telephone, or Telegraph Pole, to be used for the suspension of wires and cables, of which the following is a specification.

This invention relates to an improved pole designed for use for the suspension of electric-light, telephone, and telegraph wires and cables, the improvement consisting of a pole-section or stub and cross tree or arm sections adapted to be fitted upon the pole or stub and upon each other to any desired number, with the object of providing a sightly and durable sectional pole capable of being readily transported in knockdown condition and quickly erected and which by reason of its sectional structure may be made from desirable material and perfectly and economically treated for preservation.

Other advantages possessed by my invention are set forth in the following detailed description, in connection with which reference is to be had to the accompanying drawings.

In the drawings, Figure 1 is an elevation of a pole embodying my invention. Fig. 2 is a similar view of the pole partly disjointed. Fig. 3 is an elevation of the pole or stub section. Fig. 4 is a top view of one of the cross tree or arm sections.

Referring to the drawings by numerals, 1 denotes the pole or stub section, the lower end 2 of which is preferably reduced and tapered to fit a corresponding socket 3 in a base-section 4. Preferably the pole, its base, and the sectional cross trees or arms presently to be described are of wood, and owing to the sectional structure of the pole and parts they may be made of the most desirable woods, which, as is well known, grow and are obtainable only in short lengths. The sectional structure also enables the parts to be economically and perfectly treated for preservation. The base-section, which in practice enters the ground, has at its upper end a strengthening-band 5, preferably of metal. The upper end 6 of the pole or stub is reduced and tapered for engagement with a corresponding socket 7, formed in the lower end of a cross tree or arm section 8, which latter when fitted in place is secured, preferably, by a wooden pin 9, passed through the section and the upper pole or stub end 6. The location of the sockets in the lower ends of the pole-section and the cross tree or arm sections precludes the entrance of water at the joints, and thus the period of usefulness of the pole is prolonged.

Any number of cross tree or arm sections may be provided, whereby the pole may suspend the desired number of wires or cables. The cross trees or arms 10 are preferably passed transversely through a section 8 and secured by wooden pins 11. The lower end of each section 8 is strengthened, preferably, by a metallic band 12, and the upper end 13 is reduced and tapered to engage the socket of another section 8 or the socket of a cap-piece 14, which surmounts the pole. The cross tree or arm sections are of uniform outside diameter throughout which corresponds with the outside diameter of the pole or stub section, whereby the pole when erected is sightly and presents an unbroken appearance, and the tapered ends and sockets of the cross tree or arm sections are of uniform diameter, whereby said sections are interchangeable.

The structure may be built up to provide any number of cross trees or arms, which may afterward be increased or diminished. The pole and cross tree or arm sections may owing to the structure employed be built entirely of wood, thereby enabling their production for a comparatively low cost.

I claim as my invention—

1. In combination with a pole or stub section having a reduced and tapered upper end, a cross tree or arm section of uniform diameter throughout having in its lower end a socket conforming to the said pole or stub end and having a reduced and tapered integral upper end conforming to the socket whereby to engage the socket of a similar cross tree or arm section, and a strengthening-band around the lower end of the cross tree or arm section.

2. In combination with a pole or stub section having a reduced lower end for engagement with the socket of a base-piece, and having a reduced upper end, and a plurality of interchangeable cross tree or arm sections of uniform diameter throughout and provided with interengaging sockets and reduced integral ends.

In testimony whereof I have signed my name to this specification in the presence of two subscribing witnesses.

WILLIAM B. CROSSLAND.

Witnesses:
ELIJAH COOK,
GEO. M. GREEN.